United States Patent
Strasser et al.

(10) Patent No.: US 9,866,785 B2
(45) Date of Patent: Jan. 9, 2018

(54) AUTOMATIC REDUCTION OF VIDEO DISPLAY DEVICE POWER CONSUMPTION

(75) Inventors: David A. Strasser, Ontario (CA); Larry A. Pearlstein, Newtown, PA (US)

(73) Assignees: Advanced Micro Devices, Inc., Sunnyvale, CA (US); ATI Technologies, ULC, Markham, Ontario (CA)

( * ) Notice: Subject to any disclaimer, the term of this patent is extended or adjusted under 35 U.S.C. 154(b) by 1174 days.

(21) Appl. No.: 11/839,471

(22) Filed: Aug. 15, 2007

(65) Prior Publication Data
US 2009/0046205 A1 Feb. 19, 2009

(51) Int. Cl.
| | |
|---|---|
| H04N 5/63 | (2006.01) |
| H04N 5/775 | (2006.01) |
| H04N 21/41 | (2011.01) |
| H04N 21/4147 | (2011.01) |
| H04N 21/442 | (2011.01) |
| H04N 21/443 | (2011.01) |

(52) U.S. Cl.
CPC ............. H04N 5/63 (2013.01); H04N 5/775 (2013.01); H04N 21/4122 (2013.01); H04N 21/4147 (2013.01); H04N 21/443 (2013.01); H04N 21/4436 (2013.01); H04N 21/44231 (2013.01)

(58) Field of Classification Search
CPC ...... H04N 5/63; H04N 5/775; H04N 21/4122; H04N 21/4147; H04N 21/44231; H04N 21/443; H04N 21/4436

USPC .......................................................... 348/634
See application file for complete search history.

(56) References Cited

U.S. PATENT DOCUMENTS

| | | | |
|---|---|---|---|
| 6,055,018 A * | 4/2000 | Swan | H04N 7/0112 348/447 |
| 6,313,878 B1 * | 11/2001 | Jankowiak | 348/377 |
| 6,504,534 B1 * | 1/2003 | Takase et al. | 345/211 |
| 7,023,924 B1 * | 4/2006 | Keller | H04N 21/23424 375/240.26 |
| 7,031,385 B1 * | 4/2006 | Inoue | H04N 5/147 348/700 |
| 7,424,205 B2 * | 9/2008 | Kimura | 386/349 |
| 2006/0093317 A1 | 5/2006 | Law et al. | |
| 2006/0146056 A1 | 7/2006 | Wyatt | |
| 2006/0165283 A1 * | 7/2006 | DeWitt | G06K 9/00711 382/173 |
| 2006/0236145 A1 | 10/2006 | Yuasa et al. | |
| 2007/0033288 A1 * | 2/2007 | Kim et al. | 709/230 |

(Continued)

FOREIGN PATENT DOCUMENTS

| | | |
|---|---|---|
| CN | 1848931 A | 10/2006 |
| EP | 0 590 837 | 5/1994 |

(Continued)

Primary Examiner — Nathan Flynn
Assistant Examiner — Alfonso Castro
(74) Attorney, Agent, or Firm — Volpe and Koenig, P.C.

(57) ABSTRACT

One or more components of a video display device such as a television set can be powered down in response to a determination that a video input source has been paused. The video signal provided by the video input source can be analyzed to determine whether the video source is paused. When the video input source is no longer paused, the powered down components can be restored to fill power operation.

18 Claims, 5 Drawing Sheets

(56) References Cited

U.S. PATENT DOCUMENTS

| | | | |
|---|---|---|---|
| 2007/0127569 A1* | 6/2007 | Hatalkar | G06F 3/14 375/240.12 |
| 2007/0166000 A1* | 7/2007 | Nallur et al. | 386/68 |
| 2007/0266345 A1* | 11/2007 | Cok | 715/867 |
| 2008/0291999 A1* | 11/2008 | Lerouge et al. | 375/240.14 |
| 2009/0271525 A1* | 10/2009 | Jung et al. | 709/231 |

FOREIGN PATENT DOCUMENTS

| | | |
|---|---|---|
| EP | 0 873 012 | 10/1998 |
| EP | 0873012 | 10/1998 |
| EP | 1 463 313 | 9/2004 |
| EP | 1463313 | 9/2004 |
| EP | 1463313 A2 * | 9/2004 |
| JP | 06-110396 A | 4/1994 |
| JP | 6-250598 A | 9/1994 |
| JP | 2002 351420 | 12/2002 |
| JP | 2002351420 | 12/2002 |

* cited by examiner

AUTOMATIC REDUCTION OF VIDEO DISPLAY DEVICE POWER CONSUMPTION

BACKGROUND

Televisions and other video display devices with ever-larger screen sizes are now widely available and accessibly priced for a large segment of the consumer market. Power consumption by display screens and other components of these devices can be quite substantial. Additionally, prolonged use can lead to degradation of various components. Power consumption and component degradation of such units occurs regardless of whether a user is actively watching the screen. In some types of televisions, for example plasma and cathode ray tube models, display of a static image can cause more rapid degradation of the screen due to "burn-in."

Currently available video display devices typically have more than one power mode. In active mode, the display, tuner, and most other components of the unit are operated at full power mode. To comply with energy conservation regulations, such as the U.S. Environmental Protection Agency's Energy Star® guidelines, a video display device can include a power-down feature that activates a lower power consumption "sleep" mode or a more complete power shutdown if no video input is received for a given period of time. This approach saves power for cases in which a video data input source attached to the video display device is powered down or otherwise not actively providing a video signal to the video display device. The video signal can be an analog signal or digital video data.

Digital video recorders (DVRs), which are also known as personal video recorders (PVRs) (hereinafter generically referred to as DVRs), such as those available from various cable and satellite television providers and from TiVo™ Inc. (San Jose, Calif.), can be used to record television and other types of video programs off the air onto a hard drive. Personal computer software packages are also available that convert a desktop or laptop computer to a DVR for recording television and other types of video programming digitally and allowing playback of a video stream that is outputted to a television. Using a DVR, a viewer can enable a "pause" mode in which playback of the video program stops. For a typical DVR, the pause mode can be enabled either during playback of a prerecorded program or during viewing of a live television broadcast. The DVR can record and store a live broadcast while playback is paused so that viewing can be restarted from the paused point when the user is ready to resume. Digital versatile disk (DVD) players, another common consumer video source, can also be paused during playback of a program or movie recorded on a DVD or video CD. Video game consoles can also be connected to a video display device. Game consoles can display an unchanging image, such as for example a start-up screen, for an extended period of time if no user input is provided. Additionally, many game consoles now include video playback capabilities that allow them to be used to show programs recorded on DVD, compact disk, an internal or external hard disk drive, or other digital media. Such programs can be paused much like with a DVR or DVD player. Other devices, such as laser disk players, video cameras, video cassette recorders, personal computers, and the like, can also be connected as an external video source to a video display device and can provide an unchanging image in the video input stream.

SUMMARY

In a first aspect, an apparatus includes a video controller configured to receive a video signal from an external video input source. The controller is configured to determine whether the received video signal indicates that the external video source has entered a paused state and to cause power consumed by a video display device component coupled to the video controller to be reduced if a duration of the paused state exceeds a threshold time.

In a second interrelated aspect, a video signal is received from a video source. It is determined whether the video signal indicates that the video source has entered a paused state. A duration of the paused state is compared to a threshold time. Power consumption of a video display device component is reduced if the duration of the paused state equals or exceeds the threshold time.

In a third interrelated aspect, an apparatus includes a video input configured to be coupled to an external video source and to receive a video signal from the external video source, a video display device component, and a controller coupled to the video display device component and to the video input. The controller is configured to receive the video signal from a video input source and to determine whether the video signal indicates that the video source has entered a paused state. The controller is further configured to cause power consumed by the video display device component to be reduced if a duration of the paused state exceeds a threshold time.

In optional variations, the paused state can be determined by calculating a first representative value for a first frame in the video signal, calculating a second representative value for a second frame in the video signal, comparing the first representative value and the second representative value; and recognizing the paused state if the first representative value is substantially equivalent to the second representative value. A new representative value can optionally be calculated after reducing power to the video display device component and to restore power consumption of the video display device component if the new representative value is not substantially equal or equivalent to the first representative value. In these and other variations described below, the representative values can optionally be cyclic redundancy checks or alternatively hash values.

In another optional variation, two or more first representative values can be calculated for two or more first frames in the video signal and stored in a buffer or memory. Two or more second representative values can be calculated for two or more second frames in the video signal that occur subsequent to the two or more first frames. The external video source can be determined to have entered the paused state if one or more of the two or more first representative values is substantially equivalent to the two or more second representative values.

In still another optional variation two or more first representative values can be calculated for two or more first frames in the video signal and stored in a buffer or memory. The two or more first representative vales can be received in an order. Two or more second representative values can be calculated for two or more second frames in the video signal that occur subsequent to the two or more first frames. The external video source can be determined to have entered the paused state if two of the two or more first representative values are substantially equivalent to two of the two or more second representative values received the same order as the two of the two or more first frames.

In other optional variations, the paused state can be determined by assessing a deviation between a current frame provided by the video source and a preceding frame, and recognizing the paused state if the deviation is below a tolerance. Optionally, frames provided in the video signal can be stored, possibly on a memory coupled to a video controller. The assessing of the deviation can include digitizing the preceding frame and the current frame. The assessing of the deviation can also include calculating a maximum absolute difference of collocated pixels between the preceding frame and the current frame and determining whether the maximum difference is less than the tolerance.

In still another optional variation, the video signal can include an in-band signal that provides an indication that the video source has entered the paused state. In this variation, recognition of the indication can serve as the determination that the video signal has entered a paused state. The in-band signal can be carried in a non-display channel provided in a digital video connection or alternatively can be carried in a vertical blanking interval of the video signal.

Additional optional variations can include restoration of power consumption of the video display device component if the video signal no longer indicates the paused state. The threshold time can be set in response to a user input received via a user interface. The video display device component can optionally be a display or a tuner.

Various aspects of the presently described subject matter may provide one or more advantages, including but not limited to automatic reduction of power consumption by video display devices and extended service lifetimes of such devices.

DESCRIPTION OF THE DRAWINGS

This disclosure may be better understood upon reading the detailed description and by reference to the attached drawings, in which.

DETAILED DESCRIPTION

Figure 1A:
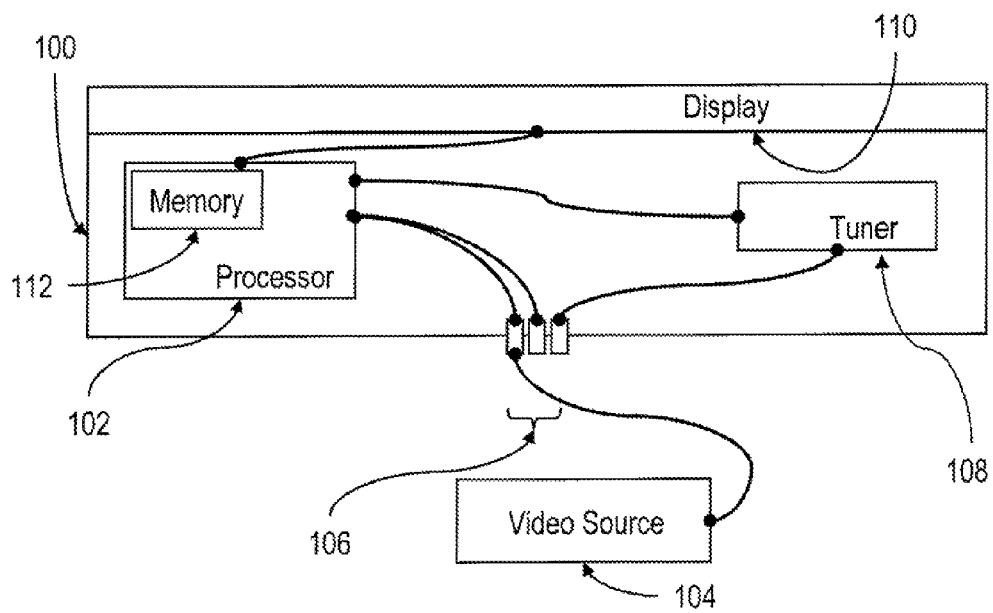
FIG. 1A is a first schematic diagram showing a video display device.

The presently disclosed subject matter provides methods, techniques, systems, structures, and articles of manufacture that recognize a paused condition in an external video source providing a video signal to a video display device such as a television set or receiver or a monitor. Throughout this disclosure, the term "video display device" should be construed to include devices and apparatuses such as a television or video display monitor, as well other systems that include a video display panel, screen, or component and one or more control or processing components that control the content displayed on the video display panel, screen, or component. The video signal can be analog or a digital video data stream. The recognition can include one or more of a variety of approaches, including but not limited to the illustrative implementations discussed herein. Upon recognition that an external video source is paused and that the paused condition has persisted for longer than a threshold time, a video display device receiving the video signal can reduce power consumed by one or more components of the video display device, including but not limited to one or more of the display, the tuner, etc. "Paused" is used to identify an instance of a static or unchanging image, in whole or in part, such as when a digital video source is paused during playback, an unchanging screen saver image is presented, a static menu (such as those included in the content stored in many pre-recorded DVDs) is presented or when a screensaver-like mode (such those often presented by DVD players) which include, for example, a large area of a static image and a smaller area of an image or images that is/are moved around within the frame, a slowly changing pattern, or even a sequence of changing images.

A user can pause an external video source providing a video signal to a video display device so that the user can attend to an activity other than actively watching television. For example, the user can pause a program or movie to visit another room in the house, to answer the phone or doorbell, to converse with another person, or to perform some other activity that does not include actively viewing the image displayed on the screen. When paused, an external video source can supply an unchanging image, such as for example a still image of the video frame at which playback was halted. Some external video sources can provide this unchanging image in the video stream until the playback is resumed due to an action by the viewer, such as for example pressing "play" on the remote control to resume playback of the program.

Other external video sources can have their own "sleep" routines built in. For example, after a set time in "pause" mode, the external video source can change the output video stream from a static image of the last frame viewed to a screensaver-like video stream. Such a screensaver-like video stream can include, for example, an image or images that is/are moved around within the frame, a slowly changing pattern, or even a sequence of changing images. These screensaver techniques are designed to reduce the likelihood of burn-in of a static image on a video display device screen that displays the result of the video stream. Some power consumption reduction benefits can result for certain types of televisions or other video display devices when a screensaver is displayed, particularly if the screensaver uses predominately dark colors over a large portion of the screen area. For example, cathode ray tube and plasma displays can consume less power when displaying a predominantly dark or black image than they do when displaying a (naturally brighter) more colorful image. Other types of displays, including liquid crystal display (LCD) panels and front and back projectors, as well as digital light processor (DLP) displays, generally include a constant intensity light source and therefore do not attain much if any power conservation when a predominantly dark screen saver routine is shown. Other components of the television, including the tuner, any audio equipment, and the like, also generally remain at full power as long as the video display device is on and receiving an active video signal from an external video source.

Figure 1B:
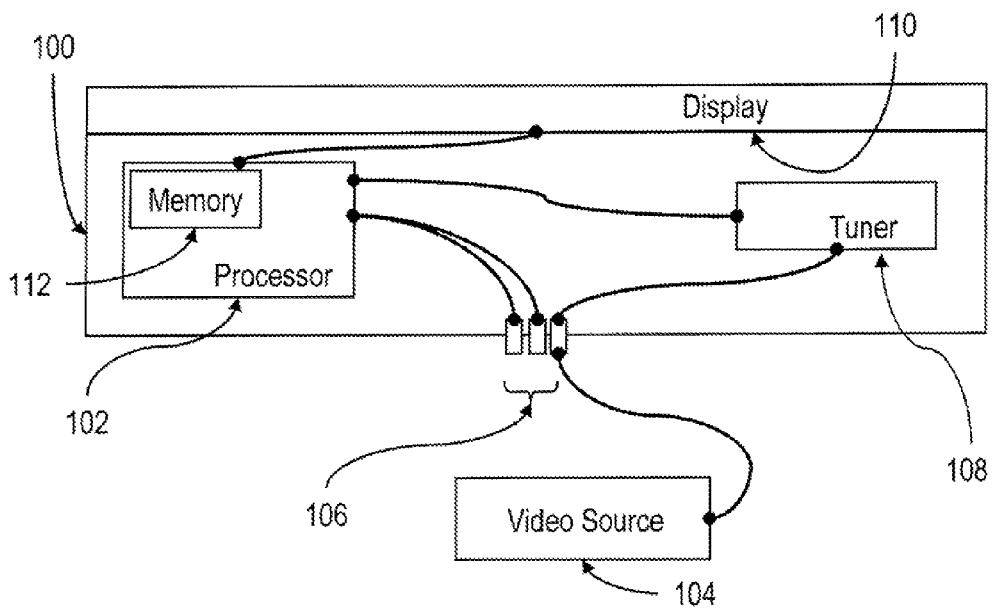
FIG. 1B is a second schematic diagram showing a video display device.

Two implementations of the presently disclosed subject matter are illustrated schematically in FIG 1A and FIG. 1B. In these implementations, a video display device 100 includes an internal processor 102 that processes incoming video signals received from a video source 104 via one or more video input ports 106 and/or a tuner 108 and outputs video signal information to a display device 110. The tuner can decode radio frequency modulated input signals, such as for example those provided by a cable or satellite television converter box or DVR connected to the video display device via coaxial cable or by an over the air antenna or from an unscrambled cable television source (e.g. one that does not require a converter box). In general, a video display device can have one or more video input ports 106, including but not limited to component video, S-Video, composite video, VGA, coaxial cable, digital inputs such as high definition multimedia interface (HDMI) and digital video interface (DVI), and the like. In the implementations shown in FIG. 1A and FIG. 1B, one of the video input ports 106 is connected to the tuner 108 which is in turn connected to the internal processor 102. The video input port 106 connected to the tuner can be a coaxial cable input. In FIG. 1A, the video source 104 is connected to a video input port 106 which is connected directly to the internal processor 102. In FIG. 1B, the video source 104 is connected to a video input port 106 which is connected to the tuner 108. The tuner 108 receives and processes a radio frequency signal carried from the external video source 104 and provides a decoded video signal to the internal processor 102. The signal processing performed by the tuner may include one or more of demodulating, selecting, filtering, or frequency shifting.

Various video sources can be connected to one or more of the input ports. One or more of the video ports can be active at any given time. For example, a user can view a first video program provided via a first video input port as well as a second video program provided via a second video input port. The second video program can optionally be viewed in a smaller window (e.g. a "picture-in-picture" box) within the area of the display 110. As discussed in greater detail below, one or more of the video signal from the video source or sources being shown on the display device can be analyzed to determine if the video source or sources have entered a paused state.

The internal processor 102 can include programming that can optionally be stored on a computer or machine readable medium 112, such as for example a memory, and implemented in hardware or software. The internal processor 102 can receive and process the incoming video signals and perform a check to determine whether the video source 104 has entered a "pause" mode. This check can optionally be accomplished using one or more of the implementations described below, or any other technique or analysis that provides an indication that a video input source has entered a paused state or is otherwise providing an unchanging image to the video display device. If a paused or unchanging image state is detected, the power consumption of one or more components of the video display device can be reduced. Once the processor determines that the paused state has terminated, the powered down component or components can be restored to full power.

The external video source 104 can optionally be a DVR, a DVD player, a video cassette recorder, a computer, a game console, or any other source that provides a video signal over a digital or analog connection. The powered down component can be the display 110, the tuner 108, or some other component or function as described in greater detail below. Other components or functions that can be powered down if a paused state is identified for the external video source 104 include, but are not limited to decoders, display interfaces (e.g. digital-to-analog converters, low voltage differential signaling components, etc.), display engine components (e.g. de-interlacers, deblockers, etc.), one or more display backlights, ambient lighting systems (e.g. the Ambilight™ system available from Philips), frame rate conversion circuitry, audio circuitry, and the like.

If the display 110 is a LCD, a light source for the LCD, such as for example a backlight, can be dimmed or completely turned off. In a plasma display, the voltage and current supplied to an electrode grid controlling an "on/off" state for individual pixels in the display can be reduced or turned off. A lamp in a DLP display can be turned off, or the current provided to the light source can be reduced. A cathode ray tube display can be powered down by reducing power to a cathode heater as well as to focusing and deflecting coils. Power consumption by other types of displays 110 can be reduced using comparable techniques. For example, surface-conduction electron-emitter displays (SED) that use surface conduction electron emitters for each individual display pixel can be powered down by reducing the surface conduction current as well as by powering down other video display device components as discussed above.

Figure 2:
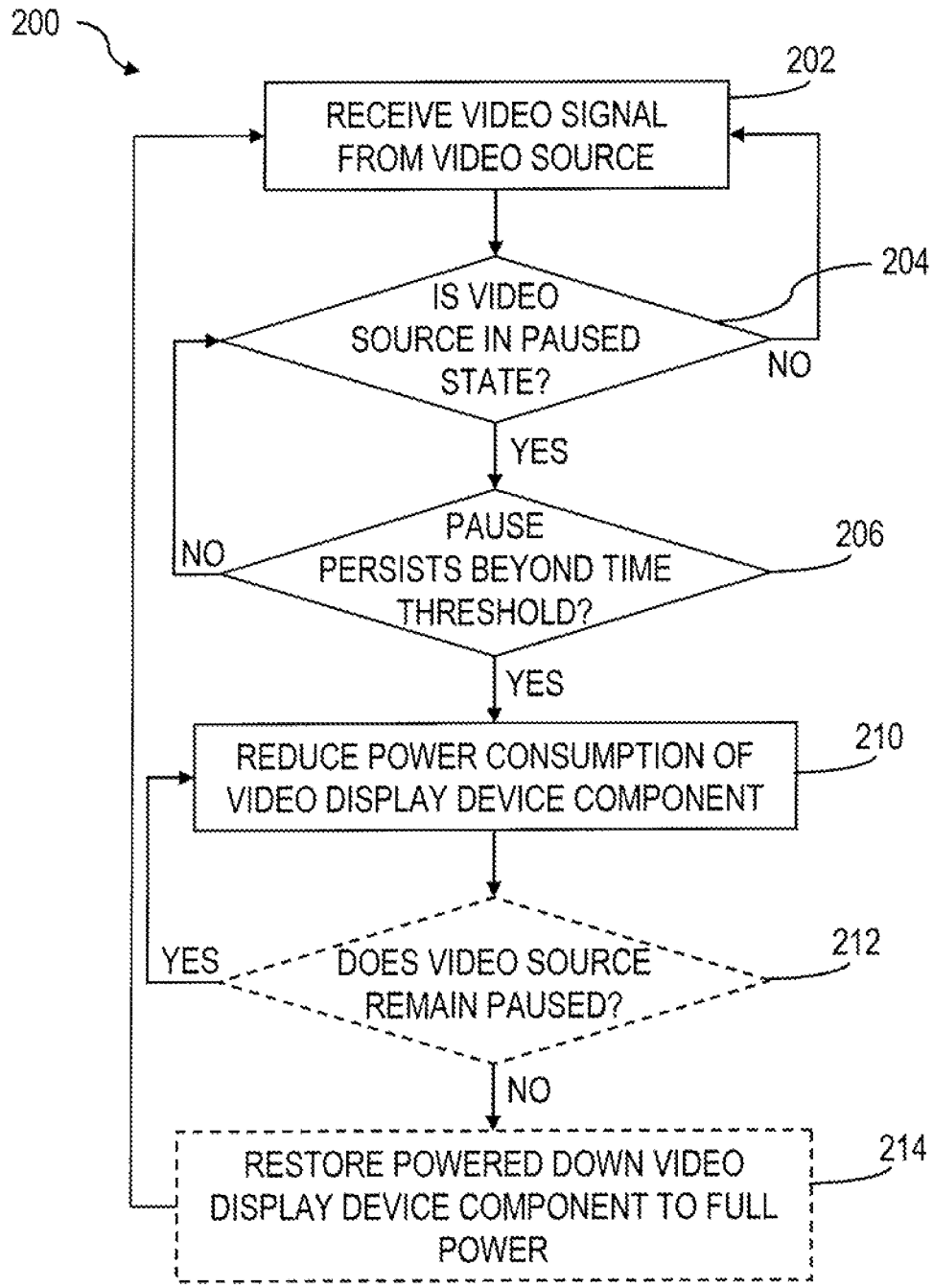
FIG. 2 is a process flow diagram illustrating a first implementation.

A method for reducing power consumption of a video display device 100 is shown in a flow chart 200 in FIG. 2. A video signal is received at 202 from an external video source 104. The signal is analyzed to determine whether the video signal from the external video source 104 carries an unchanging image. This analysis can be performed periodically, such as for example, every frame, once per second, once per minute, etc. Alternatively, the analysis can be performed at irregular intervals depending on the availability of processing resources. If the image from the video source 104 is unchanging at 204 between two such analyses within an acceptable tolerance, the temporal persistence of the unchanging image is determined at 206. If the video signal carries the unchanging image for longer than a threshold time, the power consumption of a component of the video display device 100 is reduced at 210. If the unchanging image has not persisted for longer than the threshold time, the video signal is again queried to determine if an unchanging image is being carried at 204. The threshold time can be any length of time, and can be preprogrammed or user-modifiable via a user interface or some other means.

In an optional implementation of this method, once the component or components of the video display device 100 have been powered down, the video signal can optionally be queried to determine whether it continues to carry an unchanging image at 212. If an unchanging image is still being carried, the reduced power state is maintained at 210. If the video signal image is no longer unchanging, the powered down video display device component can optionally be restored to full power at 214.

In one implementation, a hash or similar representative function can generate a relatively short representative value that is representative of the video stream/signal from an external video source 104. A representative value can be calculated to detect errors arising from transmission or storage of a block of data. The block of data can be a packet of network traffic, a block of a computer file, or as used herein, a video field, video frame or a portion of a video data stream. Examples of hash or representative functions include cyclic redundancy checks (CRC); checksums; Reed-Solomon codes, and cryptographic hashes, including but not limited to secure hash algorithms like SHA-1, SHA-256, SHA-384, or SHA-512, or Message Digest 5 (MD5); and the like. The result of applying a hashing function to a block of data is generally a small value having fixed number of bits wherein the hash function produces the same hash value for the identical block of data. A hash value can be calculated from a hashing function for video frames periodically at a frame interval. The frame interval can be one, in which case a hash value is calculated for each frame, or frame interval can be greater than one frame in which case a hash value is calculated for every $n^{th}$ frame. Hash values from successive hash function calculations can be compared to determine a relationship between the frames.

Figure 3:
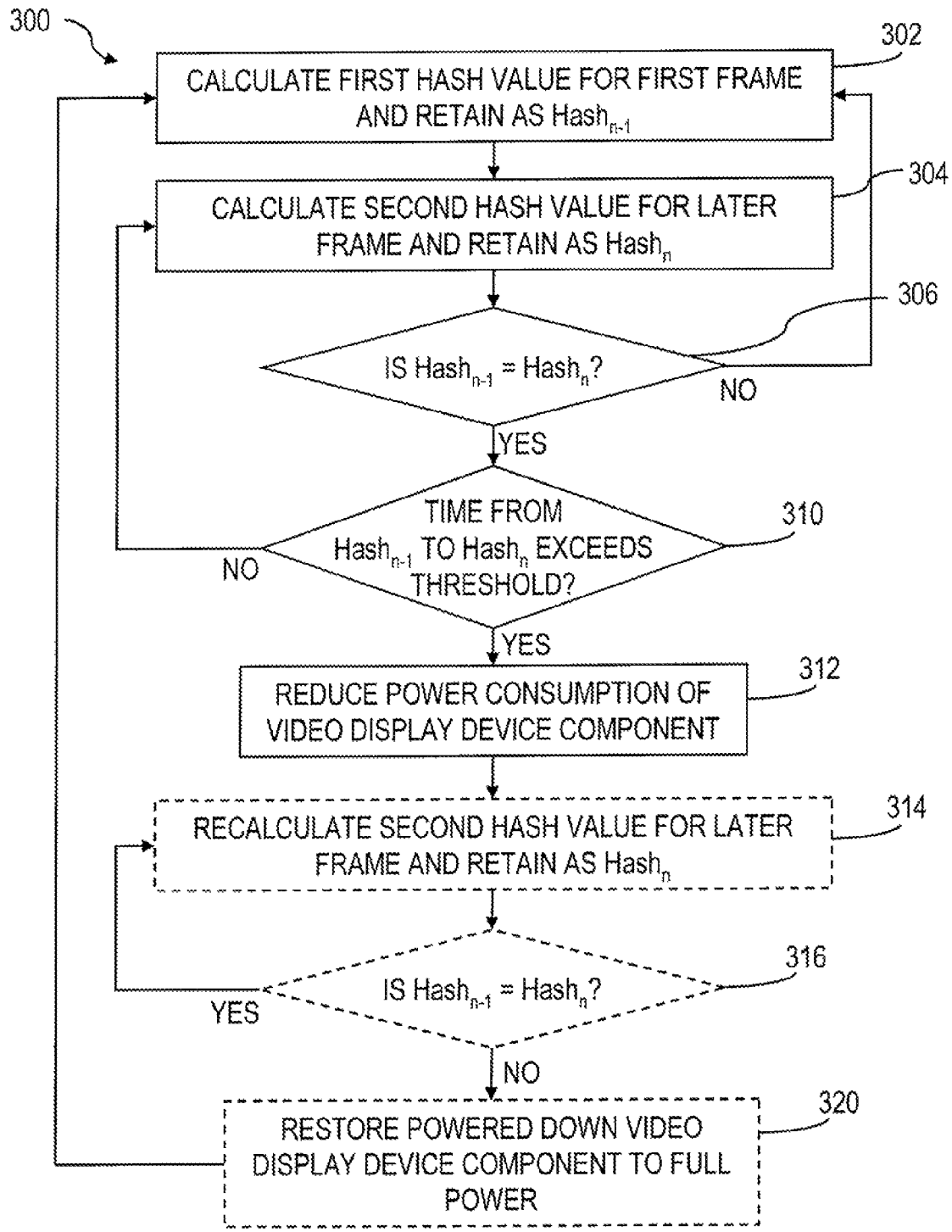
FIG. 3 is a process flow diagram illustrating a second implementation.

If the relationship between hash values for succeeding video fields, video frames or portions of a video data stream meets one or more predetermined criteria, the video stream/signal can be deemed to carry a paused, constant, or otherwise unchanging image and the controller 102 can cause the display 110 or other component of the video display device 100 to enter a predefined power-saving mode such as those described above. The predetermined criteria can be a perfect match between successive hash values. This would require complete equality of the hash values to indicate an unchanging image. In another example, absolute equality can be optional. Instead, the relationship between the two hash values can be defined to be within some predefined constraint(s) that meet system requirements to achieve the desired outcome or result. The relationship between the hash values enables the system to determine that there is a sought or expected relationship between the values that the hash values were derived from. When the hash values are determined to be substantially equivalent, video frames, video fields or portions thereof from which the hash values were derived can be for purposes of the invention considered to be either the same or similar enough to conclude that the video source has entered the paused state. For example, the hash values could be 10.3 and 10.6, so that truncating them to nearest integer value and performing a comparison could deem them to be substantially equivalent for purposes of determining whether the video source had entered the paused state. Similarly, for 10.7 and 11.2, rounding to the nearest integer and performing a comparison could deem them to be substantially equivalent for purposes of determining whether the video source had entered the paused state An example of such a method that can be used for reducing power consumption of a video display device 110 in this manner is shown in a flow chart 300 in FIG. 3. If the value of a hashing function for successive frames remains the same or substantially the same for a pre-determined period of time, the video display device 100 can be placed into low power mode. A first hash value ($Hash_{n-1}$) is calculated at 302 for a first video frame. A second hash value ($Hash_n$) is calculated at 304 for a later frame. A comparison is made to determine if $Hash_n$ is substantially equal or equivalent to $Hash_{n-1}$, at 306. If the two hash values are not substantially equal or equivalent, the hashing function calculations can be repeated. In one option, a new $Hash_{n-1}$ and a new $Hash_n$ are calculated for later frames. In another option, the previous $Hash_n$ is stored as $Hash_{n-1}$ and a new $Hash_n$ is calculated for a later frame.

If $Hash_{n-1}$ is substantially equal or equivalent to $Hash_n$, a paused state is recognized. A determination of the duration of the paused state is made by comparing the time elapsed between the first frame, for which $Hash_{n-1}$ was calculated, and the later frame, for which $Hash_n$ was calculated. If the time from $Hash_{n-1}$ to $Hash_n$ exceeds a threshold time at 310, the power consumption of a television component is reduced at 312. If the time between $Hash_{n-1}$ and $Hash_n$ does not exceed the threshold time, a new $Hash_n$ is calculated for a later frame at 304, and the comparison between $Hash_{n-1}$ and $Hash_n$ is repeated at 306.

In an optional implementation of this method, new values of $Hash_n$ are calculated for later frames at 314. As noted above, $Hash_n$ can be calculated for every frame or periodically at some frame interval. For each new $Hash_n$, at 316 a determination is made whether $Hash_{n-1}$ (the paused state hash value) is equal or equivalent to $Hash_n$ (the current frame). If $Hash_n$ is not substantially equal or equivalent to $Hash_{n-1}$, power to the powered down television component or components is restored at 320. If $Hash_{1-1}$ is substantially equal or equivalent to $Hash_n$ the screen image remains constant. A new $Hash_n$ can be calculated at 314 and the comparison 316 repeated until $Hash_{n-1}$ is not substantially equal or equivalent to $Hash_n$.

As indicated above, some video sources, when placed in a paused state, will supply to the video display, either the last frame of the video being presented or a random or predefined sequence of still images to prevent burn-in. In an alternative implementation, a set of two or more hash values can be calculated for two or more frames received from the external video source and stored in a buffer or memory. One or more of the stored hash values can be compared to the hash values calculated for two or more successive frames subsequently received from the video source to determine whether the hash values are substantially the same. The system can determine that the video source has entered a paused state if one of the stored hash values is determined to be substantially equivalent to the hash values calculated for two or more of the subsequently received frames. These substantially equivalent frames may be received immediately adjacent to each other, in a predefined order, or in a random order. The system can also determine that the video source has entered a paused state if two of the stored hash values are determined to be substantially equivalent to the hash values calculated for two or more of the subsequently received frames received in the same or substantially the same order as the frames corresponding to the hash values stored in the buffer or memory. In this manner, a regularly repeating pattern, such as for example a screensaver routine, can be identified and used as an indicator that the external video source 104.

Figure 4:
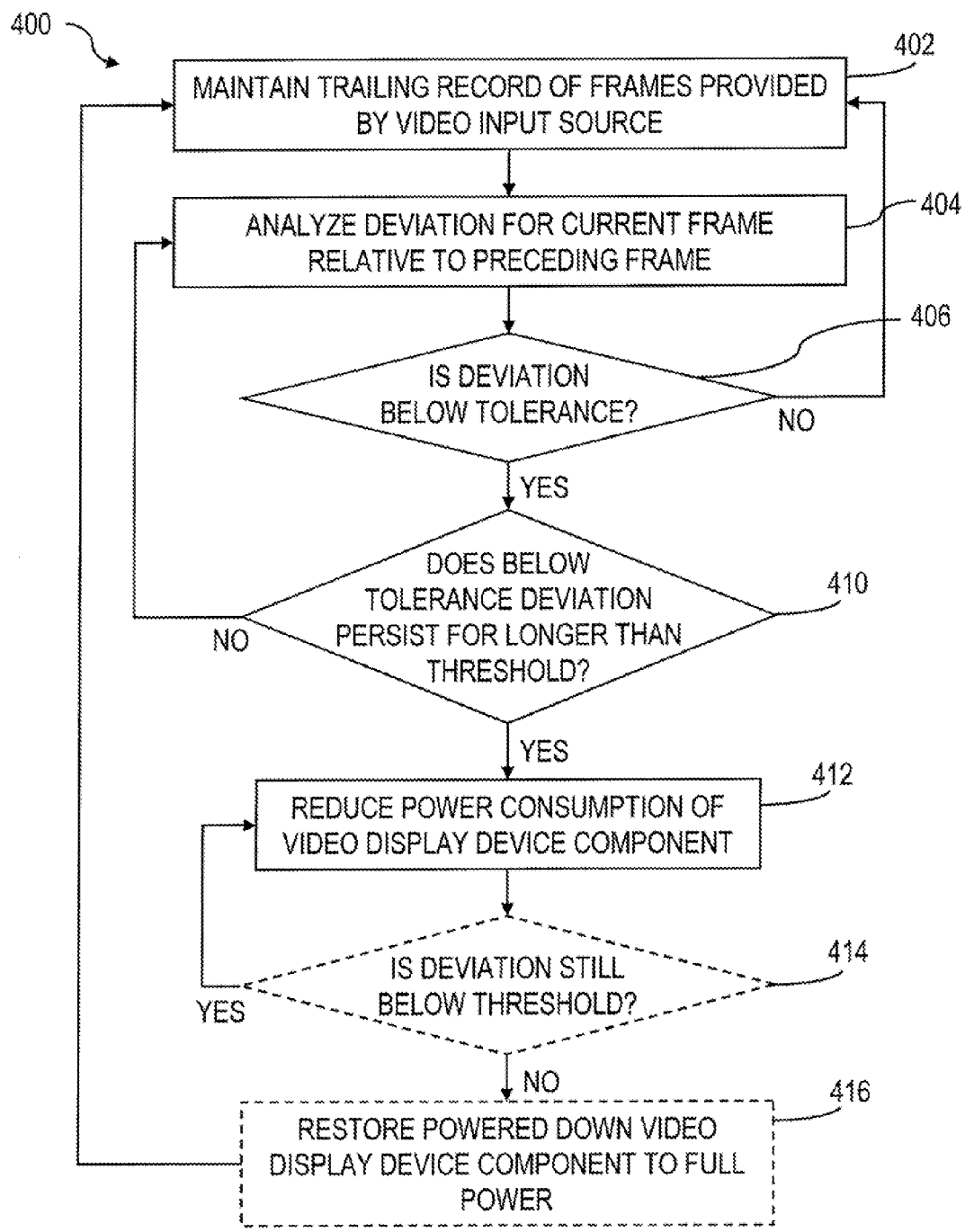
FIG. 4 is a process flow diagram illustrating a third implementation.

A method for reducing power consumption in a television that is provided with an analog video stream from an external video source 104 is shown in a flow chart 400 in FIG. 4. A trailing record of frames provided by an analog or digital video source providing a video stream is maintained at 402 using an image buffer or other comparable technique. The image buffer captures and digitizes a screenshot for frames from the video input source at a frame interval. Deviation of a current frame relative to a preceding frame is analyzed at 404. The deviation is compared to a tolerance at 406. If the maximum absolute difference is below the tolerance, the preceding and current frames are assumed to be identical. The tolerance can be set to indicate a maximum deviation from frame to frame below which the frames are considered to be effectively identical. The tolerance can be set at a level such that small deviations that can occur between identical frames in an analog video stream due to signal noise or digitization errors are not erroneously identified as differing images. In one implementation, the deviation can be quantified as a maximum difference of collocated pixels in the current and preceding frames. A typical analog video stream can have a video stream noise small enough that an 8-bit representation of the image can be analyzed to determine whether two frames of video are similar enough to indicate that the video source has been paused. The duration of the below tolerance frame to frame deviation is compared with a threshold time at 410. If this condition persists for longer than the threshold time, power consumption of one or more television components is reduced at 412. If the low deviation condition has not lasted longer than the threshold, the frame to frame analysis continues at 404.

In an optional implementation of this method, the deviation between current and preceding frames continues at 414. If the deviation remains below the tolerance, the powered down television components remain at reduced power at

412. If the preceding to current frame deviation exceeds the tolerance, power to the powered down component or components is restored at 416.

Figure 5:
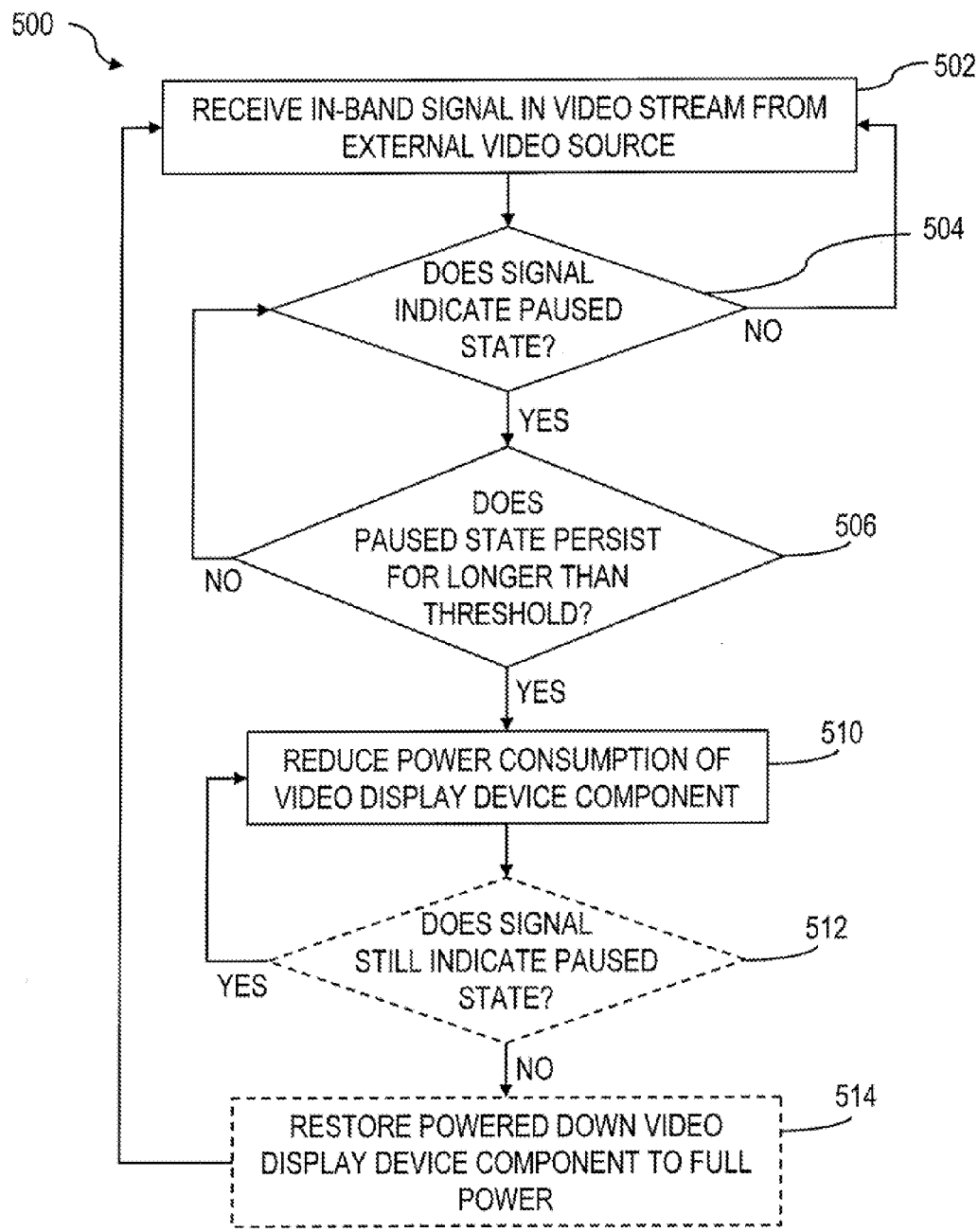
FIG. 5 is a process flow diagram illustrating a fourth implementation.

A method for reducing power consumption in a television that receives a video stream from an external video source that includes in-band signaling of a paused condition is shown in a flow chart 500 in FIG. 5. An in-band signal is received in the video stream at 502. The in-band signal can be provided by an external video source and can be carried over a standard video connection (either analog or digital) to a compatible television video input port. The in-band signal can be always present in the video stream, or it can occur only when video playback is paused by a viewer or through some other event. If some aspect of the in-band signal is recognized at 504 as indicating that the external video source has entered a paused state, the duration of the paused state relative to a threshold time is assessed at 506. If the duration of the in-band pause signal exceeds the threshold time, power consumption of one or more television components is reduced at 510. When the in-band pause signal is no longer present at 512, full power to the powered down component or components is restored at 514. Using an in-band indicator in a video data stream to indicate a "paused" condition of the video input source facilitates compatibility with current video inputs. Extra cables or jacks carrying information about the paused or unpaused state of an external video source are not required.

The in-band signal can be carried in the vertical blanking interval (VBI). The VBI is present in television video signals where it has historically been used to allow a cathode ray tube to reset between successive passes of the magnetic deflection coils that dictate where electrons hit the phosphorous screen. Data transmitted in the VBI frames are not projected on the screen. As such, a paused video input source can provide an indication in the VBI that playback has been paused while showing a screensaver in some portion of the active frames. A television processor can analyze both the active frames and the VBI to look for an other indication that the video input source is paused.

Alternatively, an explicit data packet indicating paused playback of an external video source can be carried over a channel in a digital video connection. HDMI, DVI, and other digital connections that carry video, include channels, such as for example the Dislay Data Channel (DDC), that can be used to communicate non-display data between a video source and a television or other device. The video input source can also communicate to the television that it has entered a paused state via the HDMI Consumer Electronics Control (CEC) line.

Another implementation includes a television user interface that can be used to adjust power consumption and screen saving features. For example, a preset threshold time for which the video input source is to be paused before the television powers down one or more components can be adjusted by a viewer via the user interface. It can also be possible for a viewer to specify characteristics of a powered down state, such as for example which component or components are affected and how. For example, the viewer can choose whether the display is completely shut down or set to a lower power consumption mode. Further, various stages of powering down can be set to occur depending on the length of time over which the video input source remains paused.

The subject matter described herein can be embodied in systems, apparatus, methods, and/or articles depending on the desired configuration. In particular, various implementations can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, implementations of the subject matter described herein can optionally include a computer having a display device (e.g., a CRT (cathode ray tube) or LCD (liquid crystal display) monitor) for displaying information to the user and a keyboard and a pointing device (e.g., a mouse, trackball, or remote control) by which the user can provide input to the video display device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

Although a few variations have been described in detail above, other modifications, additions, and implementations are possible are within the scope and spirit of the disclosed subject matter. For example, due to the nature of software, functions described above can be implemented using software, hardware, firmware, hardwiring, or combinations of any of these. Features implementing functions can also be physically located at various positions, including being distributed such that portions of functions are implemented at different physical locations.

Further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results.

A "signal" or "stream" can be modified by a component and referred to herein (in the description and/or claims) as "the signal" or "the stream" both before and after the modification. For example, a "stream" or "signal" that is provided by a tuner to a processor module can be modified by intervening components (e.g., a modulator) and still be referred to as "the stream" or "the signal" before and after the tuner, the intervening components, and the processor module.

What is claimed is:

1. An apparatus comprising:
a video controller for controlling a video display component coupled to the controller, the video controller comprising circuitry configured to receive a video signal from an external video source, circuitry configured to determine whether the received video signal includes an indication that the external video source has entered a paused state, and circuitry configured to cause the video display component to be placed in a low power mode responsive to the indication and if a duration of the paused state exceeds a threshold time;
wherein the video controller further comprises circuitry configured to
calculate a first representative value for each of two or more first frames in the video signal and store the two or more first representative values in a buffer or memory;
calculate a second representative value for each of two or more second frames in the video signal, the two or more second frames occurring subsequent to the two or more first frames; and
determine that the external video source has entered the paused state if one of the first representative values is substantially equivalent to each of the second representative values.

2. The apparatus of claim 1, further comprising a user interface coupled to the video controller, the video controller being configured to receive an indication of the threshold time from the user interface.

3. The apparatus of claim 1, wherein the first representative values and the second representative values comprise first hash values and second hash values, respectively.

4. The apparatus of claim 1, wherein the video controller, after reducing power to the video display component, is further adapted to calculate a third representative value and to restore power consumption of the video display component if the third representative value is not substantially equivalent to one of the first representative values.

5. The apparatus of claim 1, wherein the video controller is configured to determine the paused state by recognizing an indication that the video source has entered the paused state, the indication being provided by an in-band signal carried with the video signal.

6. The apparatus of claim 1, wherein the video controller is configured to determine the paused state by assessing a deviation between a second frame received from the video source and a first frame received from the video source prior to the second frame, and recognizing the paused state if the deviation is below a tolerance.

7. The apparatus of claim 6, further comprising a memory coupled to the video controller and wherein the video controller is configured to store frames provided in the video signal.

8. The apparatus of claim 6, wherein the assessing of the deviation comprises digitizing the first frame and the second frame.

9. The apparatus of claim 6, wherein the assessing of the deviation comprises calculating a maximum absolute difference of collocated pixels between the first frame and the second frame and determining whether the maximum difference is less than the tolerance.

10. A method implemented by a controller in a video display device, comprising:
receiving a video signal from an external video source;
determining whether the video signal includes an indication that the video source has entered a paused state;
determining a time duration of the paused state;
comparing the duration of the paused state to a threshold time; and
causing power to a video display component of the video display device to be placed in a low power mode responsive to the indication and if the duration of the paused state equals or exceeds the threshold time;
wherein determining the paused state comprises:
calculating a first representative value for each of two or more first frames in the video signal and storing the two or more first representative values in a buffer or memory;
calculating a second representative value for each of two or more second frames in the video signal, the two or more second frames occurring subsequent to the two or more first frames; and
determining that the external video source has entered the paused state if one of the first representative values is substantially equivalent to each of the second representative values.

11. The method of claim 10, wherein the video source is external to a device that comprises the video display component.

12. The method of claim 10, further comprising restoring power consumption of the video display component if the video signal no longer indicates the paused state.

13. The method of claim 10, wherein the threshold time is set in response to a user input received via a user interface.

14. The method of claim 10, wherein the determining of the paused state comprises:
assessing a deviation between a second frame received from the video source and a first frame received from the video source prior to the second frame; and
recognizing the paused state if the deviation is below a tolerance.

15. The method of claim 10, wherein the video signal comprises an in-band signal that provides an indication that the video source has entered the paused state and the determining comprises recognizing the indication.

16. The method of claim 15, wherein the in-band signal is carried in a non-display channel provided in a digital video connection.

17. The method of claim 15, wherein the in-band signal is carried in a vertical blanking interval of the video signal.

18. The method of claim 10, wherein the determining comprises recognizing an indication that the video source has entered the paused state, the indication being provided by an in-band signal carried with the video signal.

* * * * *